Figures 1, 2:
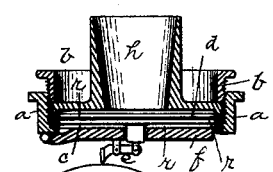

(No Model.)

L. S. CLARKE.
PHONOGRAPH RECORDER AND REPRODUCER.

No. 415,499. Patented Nov. 19, 1889.

Witnesses:
J. M. Cooke
Robt. D. Totten

Inventor
Louis S. Clarke
By James I. Kay
Attorney

UNITED STATES PATENT OFFICE.

LOUIS S. CLARKE, OF PITTSBURG, PENNSYLVANIA.

PHONOGRAPH RECORDER AND REPRODUCER.

SPECIFICATION forming part of Letters Patent No. 415,499, dated November 19, 1889.

Application filed August 2, 1889. Serial No. 319,518. (No model.)

*To all whom it may concern:*

Be it known that I, LOUIS S. CLARKE, a resident of Pittsburg, in the county of Allegheny and State of Pennsylvania, have invented a new and useful Improvement in Phonograph Reproducers and Recorders; and I do hereby declare the following to be a full, clear, and exact description thereof.

My invention relates to phonograph recorders and reproducers, its object being to provide an instrument which will be free from the grating or disagreeable sounds often found in such instruments and caused either by the record made in recording or by the instrument in reproducing the sound. The sound reproduced by the most improved phonographs have a slight grating or like disagreeable sound, this being occasioned, as it is believed, by the slight friction of the reproducing stylus in traveling over the surface forming the record or from an increased vibration imparted to the diaphragm in recording, so producing a record containing such imperfections which appear in the reproduction. In order to overcome this grating or disagreeable sound in the phonograph, from whatever cause it may arise, I have constructed the same with a glass or like diaphragm connected to the recording or reproducing stylus and a diaphragm above the same, so forming a confined air-space between the two diaphragms, and it is believed that by the air-cushion so obtained the sound is softened, either in record or in the reproduction of the record made, it being found that while a clear and distinct articulation is obtained the sound is softened, so as to make it much more pleasant and to overcome the difficulty heretofore experienced in such instruments.

To enable others skilled in the art to make and use my invention, I will describe the same more fully, referring to the accompanying drawings, in which—

Figure 1 is a sectional view of the reproducing-instrument illustrating my invention, and Fig. 2 is an enlarged sectional view of part of the same.

Like letters of reference indicate like parts in each.

The phonograph reproducing-instrument illustrated in the drawings is an Edison instrument of improved form, and is composed of the annular frame $a$, the screw-ring $b$, which screws into the frame and the funnel $h$, against which the screw-ring presses and which confines the diaphragms therein. Fitting against an annular flange at the base of the frame $a$ is a rubber or like ring $r$, against which the diaphragm $c$ fits, this diaphragm being formed of glass or like material and having secured to it the reproducing-stylus $e$, the stylus being secured to the diaphragm by a suitable cement and the stylus being pivoted to the weight $f$, this being arranged in the most improved manner for the Edison phonograph, though the stylus may be secured to the lower diaphragm $c$ in any suitable manner. Resting on the lower diaphragm $c$ is another rubber or like ring $r$, upon which the upper diaphragm $d$ rests, another rubber or like ring $r$ being placed upon the same, and the two diaphragms being confined by the funnel $h$ and screw-ring $b$, as above referred to. Below the instrument is the recording-surface, which may be formed of any suitable material.

In constructing the phonograph in accordance with my invention I prefer to employ a film of glass for the diaphragms, though gutta-percha, india-rubber, or other suitable material which will confine the air may be employed. I also prefer to employ two different thicknesses of diaphragm in the reproducer, the thinner diaphragm being connected to the stylus, and therefore being the more susceptible to the motions of the stylus in reproducing, while the thicker diaphragm receives the vibrations caused in reproducing, the vibrations being imparted to it through the confined air-space between the two different diaphragms. In practice I find that one diaphragm or glass film about one-thousandth of an inch in thickness and one diaphragm about one five-hundredth of an inch in thickness give good results, the confined air-space between the two being very slight, but yet sufficient to overcome the disagreeable, harsh, loud, or grating sounds heretofore occurring in such instruments.

In employing a reproducer or recorder embodying my invention in recording the sound the vibrations caused by the voice or suitable instrument strike against the upper diaphragm, and such vibrations are imparted to the lower or recording diaphragm through the confined air-space between the two, the lower diaphragm imparting the proper movements to the stylus to produce the record, any extreme vibrations imparted to the upper diaphragm being softened down by the cushioning air-space between the two, and the stylus forming a record which will reproduce the sound free from such extreme vibrations or harsh sounds. In reproducing with the instrument, the friction of the stylus upon the recording-surface, even where words or other particular sounds have been recorded, will be sufficient to impart vibrations to the lower diaphragms such as create a harsh or grating sound, which would naturally be heard through the instrument; but as the vibrations so imparted to the lower diaphragm are imparted to the upper diaphragm through the confined air-space it is found that the sound caused by the friction of the instrument in reproducing or by the extreme vibrations of the lower plate is overcome, a perfect articulation and reproduction of the particular words or sounds imparted to the instrument is obtained, and the reproduction is toned down and softened, so as to make it more agreeable, being entirely relieved from harsh, loud, or grating sounds. The effect produced is of course more noticeable with the reproducer; but the reproduction of the record formed by a recorder embodying my invention is much better and freer from such sounds than where the ordinary recorder is employed.

What I claim as my invention, and desire to secure by Letters Patent, is—

1. A phonograph recorder or reproducer having a glass or like diaphragm connected to the recording or reproducing stylus, and a glass or like diaphragm above the same, forming a confined air-space between them, substantially as and for the purpose set forth.

2. A phonograph recorder or reproducer having two glass or like diaphragms and a confined air-space between the same, one diaphragm being thicker than the other, and one of said diaphragms being connected to the recording or reproducing stylus, substantially as and for the purpose set forth.

3. A phonograph-reproducer having two glass or like diaphragms forming a confined air-space between them, the one of said diaphragms being thicker than the other, and the stylus being connected to the thinner diaphragm, substantially as and for the purpose set forth.

In testimony whereof I, the said LOUIS S. CLARKE, have hereunto set my hand.

LOUIS S. CLARKE.

Witnesses:
 J. N. COOKE,
 JAMES I. KAY.